United States Patent
Bilodeau

(10) Patent No.: US 8,239,599 B1
(45) Date of Patent: Aug. 7, 2012

(54) SYSTEM AND METHOD FOR HANDLING DATA STREAMS

(75) Inventor: Guy Bilodeau, St. Laurent (CA)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/162,348

(22) Filed: Jun. 16, 2011

(51) Int. Cl.
*G06F 13/24* (2006.01)

(52) U.S. Cl. ........................ 710/263; 719/321

(58) Field of Classification Search ............... 710/107, 710/260–266; 719/321
See application file for complete search history.

(56) References Cited

U.S. PATENT DOCUMENTS

| | | | |
|---|---|---|---|
| 4,933,846 A * | 6/1990 | Humphrey et al. ........... | 710/107 |
| 5,506,987 A | 4/1996 | Abramson et al. | |
| 5,517,648 A | 5/1996 | Bertone et al. | |
| 6,052,739 A | 4/2000 | Bopardikar et al. | |
| 6,205,508 B1 | 3/2001 | Bailey et al. | |
| 7,398,380 B1 | 7/2008 | Lovett et al. | |
| 7,554,909 B2 | 6/2009 | Raghunath et al. | |
| 7,581,064 B1 | 8/2009 | Zedlewski et al. | |
| 7,584,316 B2 | 9/2009 | Oner | |
| 7,707,344 B2 | 4/2010 | Chang et al. | |
| 7,934,036 B2 | 4/2011 | Conti et al. | |
| 2009/0193168 A1 | 7/2009 | Chang et al. | |
| 2010/0332909 A1 | 12/2010 | Larson | |

* cited by examiner

*Primary Examiner* — Clifford Knoll
(74) *Attorney, Agent, or Firm* — Roosevelt V. Segarra

(57) ABSTRACT

Systems and methods are provided that forward or route data streams using a plurality of processors, while maintaining the correct sequence of data packets within the data stream. Each interface may be associated with a respective one processor such that data packets received by an interface are handled by its respective one processor. Once a data packet is received by an interface, the processor associated with the interface may determine whether the received data packet is intended for another interface associated with another respective one processor. If the processor determines that the data packet is intended for another interface, the data packet may be forwarded to the processor associated with the other interface.

21 Claims, 5 Drawing Sheets

SYSTEM AND METHOD FOR HANDLING DATA STREAMS

BACKGROUND

Most multiprocessing systems distribute multiple tasks among a plurality of inter-connected processors. In a multiprocessing system, a task can be divided into smaller tasks that are executed in parallel so as to enhance overall performance. Multiprocessing has many uses in science, industry, and business.

While multiprocessing often results in improved performance, it may be suboptimal in certain situations. For example, computer network access points forward and route data streams made up of data packets that are usually sequential in nature (e.g., voice, video, etc.). Parallel processing of data streams may cause data packets to be routed or forwarded out of sequence, which can ultimately result in performance degradation.

DETAILED DESCRIPTION

Aspects of the application provide systems and methods that forward or route data streams with a plurality of processors, while maintaining the correct sequence of data packets within the data streams. At startup, each processor may be associated with an interface of the system such that data packets received by an interface are handled by its respective processor. The processor associated with an interface may determine whether a received data packet is intended for a destination interface associated with a destination processor. If the data packet is intended for the destination interface, the data packet may be forwarded to the destination processor associated with the destination interface.

The aspects, features and advantages of the application will be appreciated when considered with reference to the following description of examples and accompanying figures. The following description does not limit the application; rather, the scope of the application is defined by the appended claims and equivalents. While certain processes in accordance with aspects of the present disclosure are shown in the figures as occurring in a linear fashion, this is not a requirement unless expressly stated herein. Different processes may be performed in a different order or concurrently.

Figure 1:
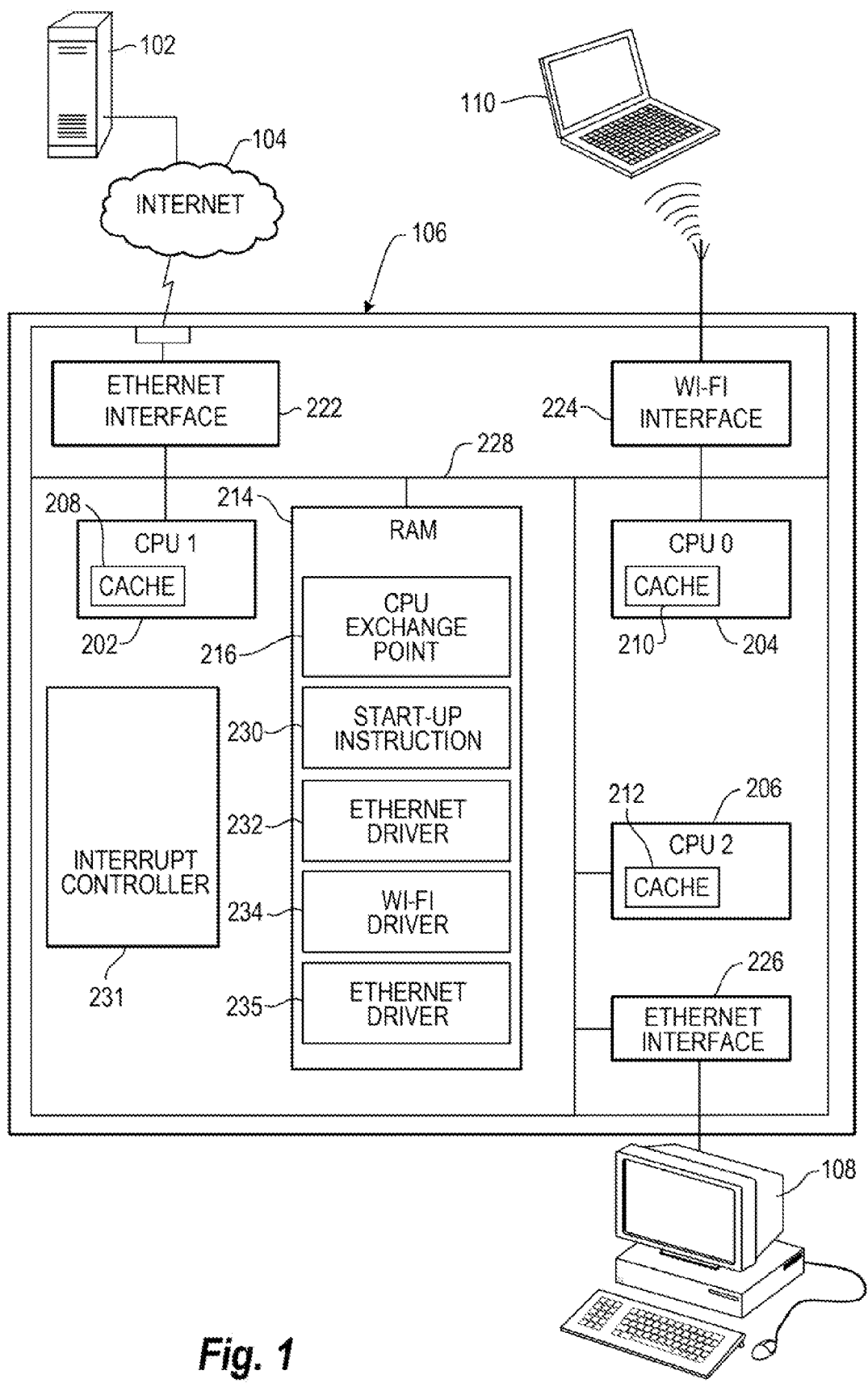
FIG. 1 is a close up illustration of an access point.

FIG. 1 presents a schematic diagram of an illustrative access point 106. Processors 202, 204, and 206 may each have local cache memory 208, 210, and 212 respectively. Memory 214 may be global memory accessible by each processor. All components may be interconnected via a global bus 228. The memory 214 may be of any type or any device capable of storing information accessible by the processor, such as a hard-drive, ROM, RAM, CD-ROM, flash memories, write-capable or read-only memories. Local cache memories 208, 210, and 212, may comprise any type of device used in connection with cache memory. For example, each of the cache memories may be a static random access ("SRAM") device and can be a single level cache memory or multilevel cache memory with a cache hierarchy. Each processor may comprise any number of well known processors, such as processors from Intel® Corporation. Alternatively, each processor may be a dedicated controller for executing operations, such as an ASIC.

FIG. 1 shows access point 106 in communication with a computer 102, computer 108, and laptop 110 all of which may have components normally used in connection with a computer. Each computer and laptop may be equipped with one or more processors, memories, and instructions. The computers and the laptop of FIG. 1 may be capable of indirect communication with access point 106, such as over network 104 or a wireless local area network ("WLAN"). Alternatively, a computer may be directly coupled to access point 106, as demonstrated by computer 108. Although only a few computing devices are depicted in FIG. 1, it should be appreciated that a typical system can include a large number of connected servers and clients, with each different computer or device being at a different node of the network.

Figure 2:
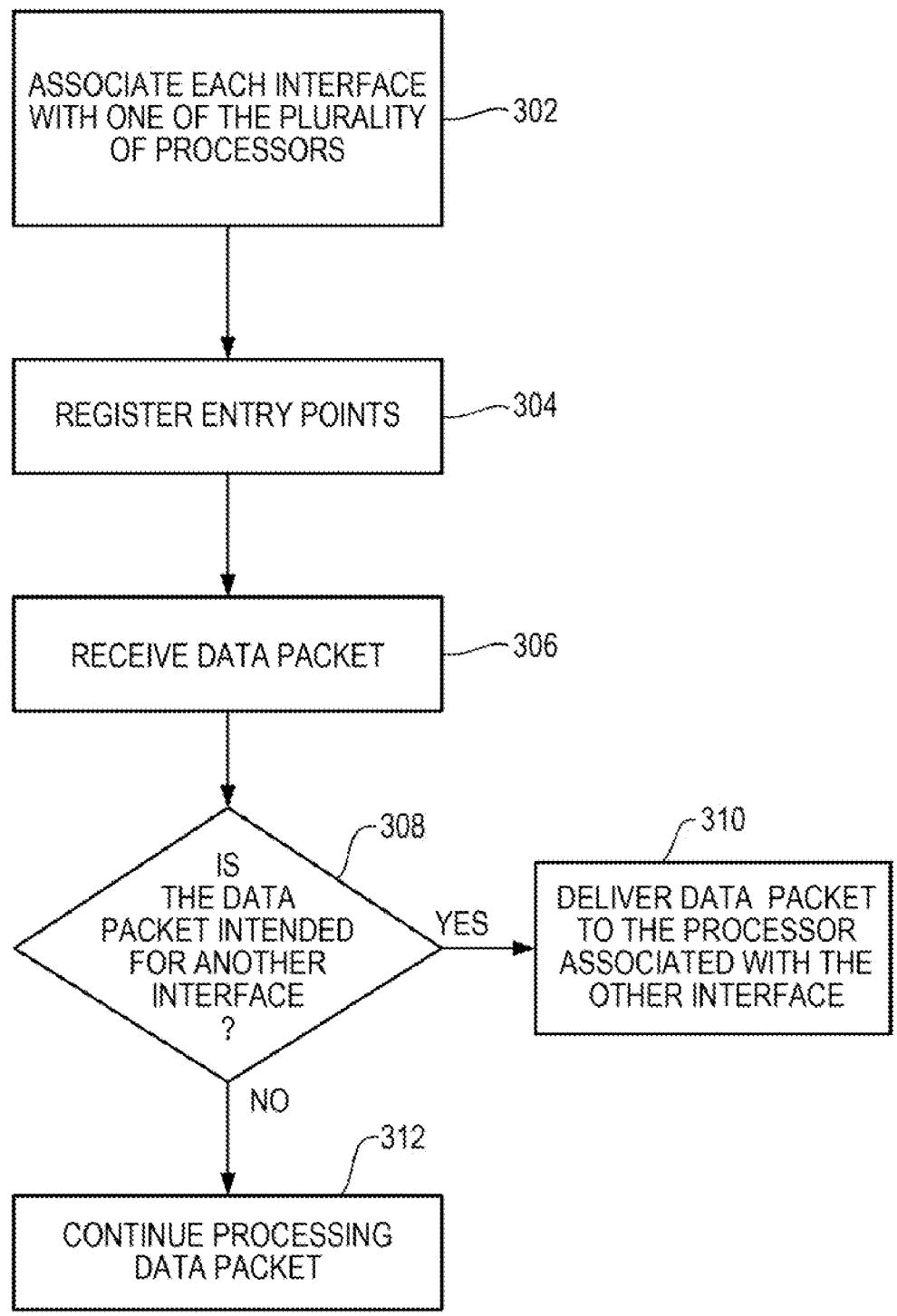
FIG. 2 is a flow diagram in accordance with aspects of the application.

Also presented in FIG. 1, are interfaces 222, 224, and 226. Each interface may comprise circuitry suitable for connecting access point 106 to nodes on a network, such as computers 102, 108 and laptop 110, using known standards and protocols. In the example of FIG. 2, interface 222 and 226 are Ethernet interfaces that implement a standard encompassed by the Institute of Electrical and Electronic Engineers (IEEE), standard 802.3. In the Ethernet/IEEE 802.3 system, messages between devices on the network travel in data packets or frames. The illustrative access point 106 of FIG. 1 may also have a wireless-fidelity ("Wi-Fi") interface 224, which encompasses the IEEE 802.11 suite of standards. As with Ethernet, messages generated in accordance with Wi-Fi standards also travel in data packets. It is understood that references to Ethernet and Wi-Fi are only for illustrative purposes and that other standards or protocols may be utilized, such as Bluetooth or token ring. Examples disclosed herein are not limited to Ethernet or Wi-Fi.

Interrupt controller 231 may be a device for directing interrupt requests ("IRQs") from either one of the interfaces 222, 224, or 226 to one or more of the processors 202, 210, and 212. In one example, interrupt controller 231 may be a programmable interrupt controller ("PIC") utilizing the Intel® advanced programmable interrupt controller ("APIC") architecture, which may be configured to prioritize and direct IRQs to certain processors.

Memory 214 is shown storing various programming instructions that may be executed by any one of the processors 202-206. These instructions may be executed directly (such as machine code) or indirectly (such as scripts) by the processors. In that regard, the terms "instructions," "steps" and "programs" may be used interchangeably herein. The instructions may be stored in any computer language or format, such as in object code or modules of source code.

A processor may deliver a received data packet to a destination processor in accordance with instructions contained in CPU exchange point 216. Moreover, CPU exchange point 216 may instruct a destination processor to capture a packet delivered by an originating processor. While only one CPU exchange point is depicted, it is understood that other instances of a CPU exchange point may be implemented to enhance performance. Startup instructions 230 may configure interrupt controller 231 to associate each interface with a processor such that all data packets received by each interface are handled by its respective processor. In turn, each respective processor may handle the data packets in accordance with a corresponding driver, such as Ethernet drivers 232, 235 or Wi-Fi driver 234. All the instructions shown in FIG. 1 are discussed in more detail below.

Although the processors and memory are functionally illustrated in FIG. 1 as being within the same block, it will be understood that access point 106 may actually comprise additional processors and memories that may or may not be stored within the same physical housing or location. For example, some or all of the instructions may be stored on a removable CD-ROM and others within a read-only computer chip. Some or all of the instructions may be stored in a location physically remote from, yet still accessible by, the processors.

Figure 3:
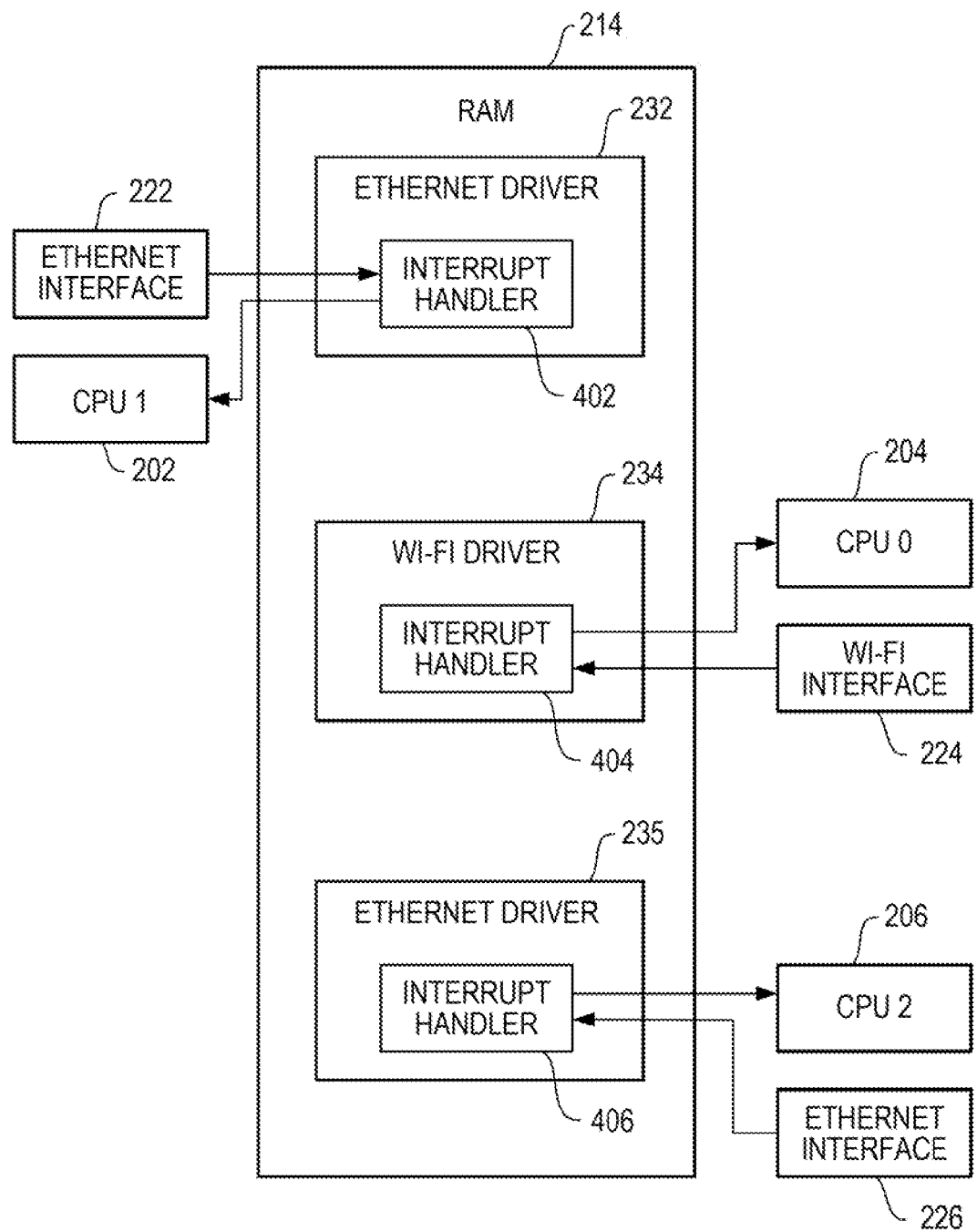
FIG. 3 is a working example of associations between processors and interfaces.
Figure 4:
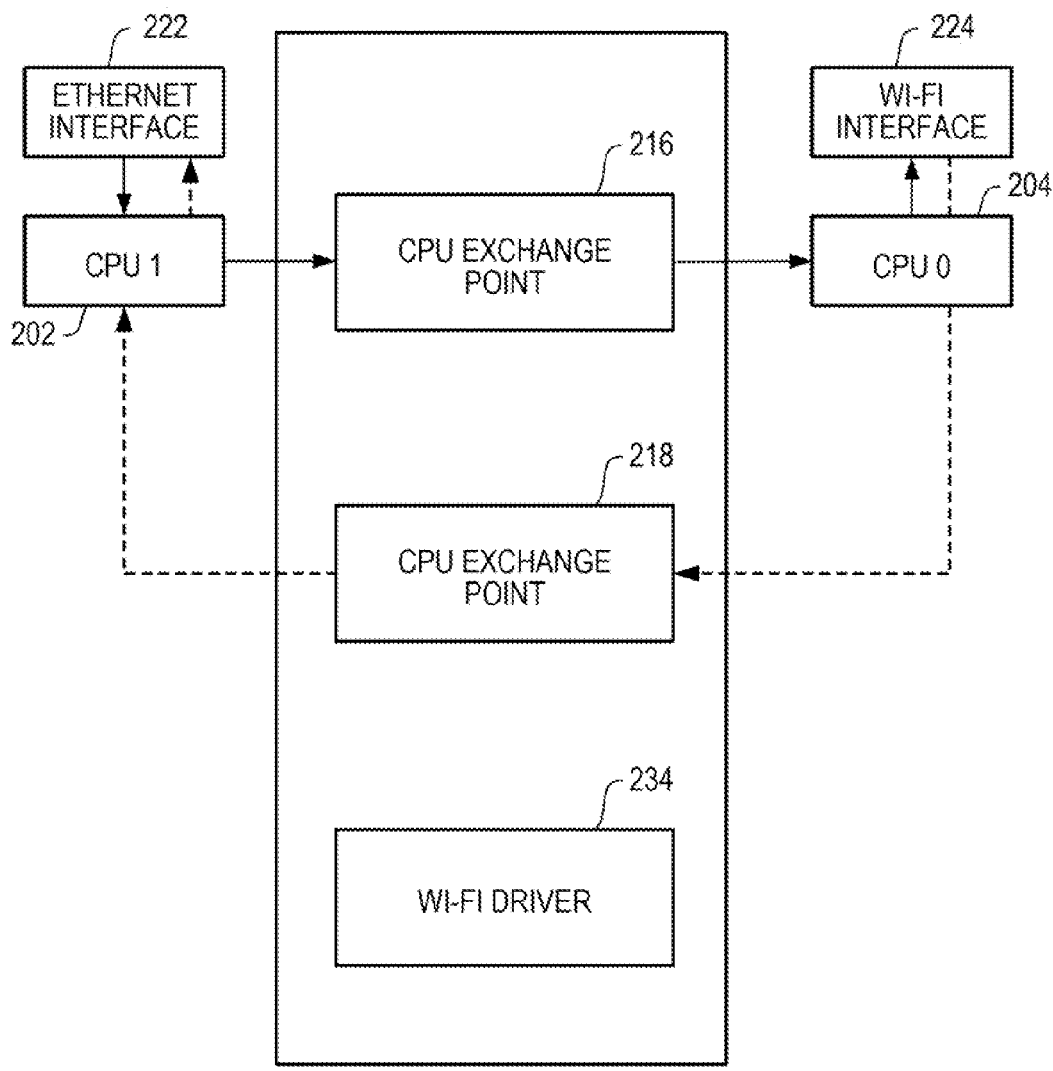
FIG. 4 is a functional diagram of inter-processor communication in accordance with aspects of the application.
Figure 5:
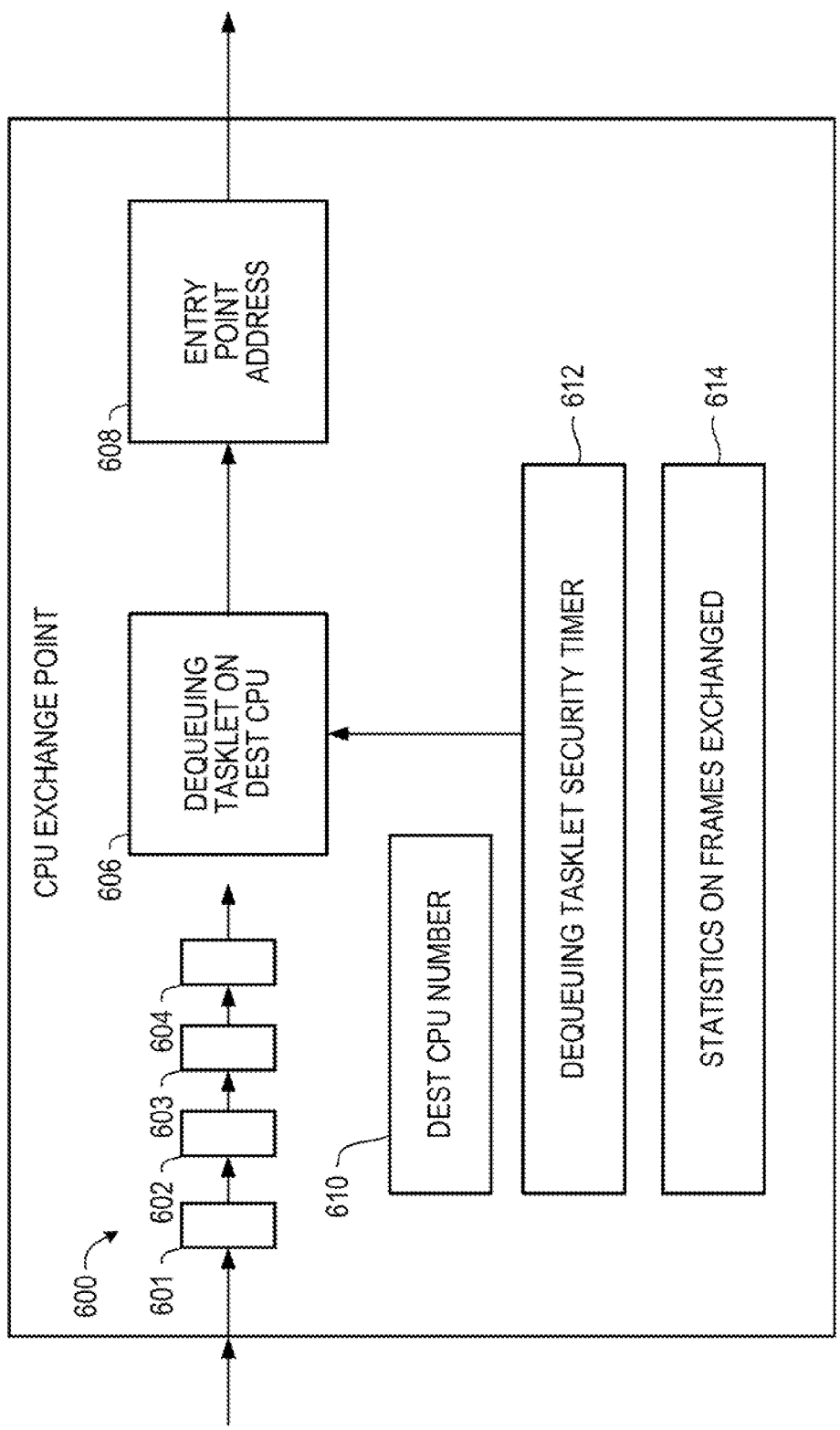
FIG. 5 is an illustrative processor exchange point.

One working example of the system and method is shown in FIGS. 2-5. In particular, FIG. 2 illustrates a flow diagram of a process for initializing each interface and handling an incoming data packet. FIGS. 3-5 illustrate aspects of initialization and data packet flow. The actions shown in FIGS. 3-5 will be discussed below with regard to the flow diagram of FIG. 2.

As shown in block 302 of FIG. 2, each interface is associated with one of the plurality of processors. The instructions for establishing these associations may be contained in startup instructions 230 of FIG. 1. An example is presented in FIG. 3. Each device driver 232, 234, and 235 may include an interrupt handler 402, 404, and 406 respectively. As noted above, startup instructions 231 may establish an association between each interface and one processor by configuring interrupt controller 131 to direct an IRQ generated by each interface to its respective processor.

Referring back to FIG. 2, entry points for each device driver 232, 234, and 235 may be registered, as shown in block 304. An entry point is a memory address within a set of instructions from which a processor begins execution. Many operating systems, such as Linux, permit registration of these entry point memory addresses. As will be discussed in more detail below, these entry points may be utilized to complete a transfer of a data packet from one processor to another such that the destination processor can handle the data packet independent of information stored in the local cache of the originating processor.

In block 306 of FIG. 2, a data packet is received by an interface. Upon arrival of a data packet to any of the interfaces, the interrupt controller 231 may direct an IRQ to the respective processor. In turn, the respective processor may invoke the corresponding interrupt handler 402, 404, or 406 illustrated in FIG. 3.

The processor handling the interrupt determines whether the data packet is intended for another interface (i.e., a destination interface) that is associated with another processor (i.e., a destination processor), as shown in block 308 of FIG. 2. If the processor determines that the data packet is intended for another interface, the processor delivers the packet to the processor associated with the other interface as shown in block 310. Referring to the example of FIG. 3, a data packet may be received by Ethernet interface 222, which is associated with processor 202. If processor 202 determines that the data packet is intended for Wi-Fi interface 224, which is associated with processor 204, the processor 202 may deliver the data packet to processor 204. Processor 204 may then route the data packet to a computer wirelessly communicating with access point 106 in accordance with Wi-Fi device driver instructions 234.

FIGS. 4-5 present a working example of data packet delivery between processors. The transfers may be carried out in accordance with the instructions of a CPU exchange point. For ease of illustration, FIG. 4 focuses on exchanges between Ethernet interface 222 and Wi-Fi interface 224. An additional CPU exchange point 218 is also shown in FIG. 4. As noted earlier, additional CPU exchange points may be added to enhance performance. CPU exchange point 216 may configure processor 202 to route a data packet to processor 204, if the data packet is intended for Wi-Fi interface 224. CPU exchange point 218 may configure processor 204 to route a data packet to processor 202, if the data packet is intended for Ethernet interface 222. However, it is understood that one CPU exchange point may configure data packets to be routed in both directions and that FIG. 4 is merely illustrative. While FIG. 4 focuses on the exchange between Ethernet interface 222 and Wi-Fi interface 224, the same mechanisms described herein may be implemented between Ethernet interface 222 and Ethernet interface 226 and Wi-Fi interface 224 and Ethernet interface 226.

FIG. 5 is a close up illustration of various data structures, fields, and data objects that may be implemented within a CPU exchange point. A CPU exchange point 216 or 218 may have a queue data structure 600. The illustrative queue 600 is shown with a plurality of data packets 601-604 waiting to be processed. Queue 600 may be a linked list of data packets. A CPU exchange point may also include other fields. Field 610 may store the address of the destination processor; field 606 may store an address of a data packet removal task executed by the destination processor to de-queue a data packet; and, entry point field 608 may store one or more entry points into the device driver instructions of the destination interface. The destination processor may begin executing the device driver instructions at the entry point memory address.

As noted above, the entry point address allows the destination processor to handle the data packet independent of information stored in the local cache of the originating processor. Accordingly, the local cache of the originating processor is more available for other tasks, since information associated with the transferred data packet is rendered obsolete by the instructions at the entry point address. One example of a good entry point may be a subroutine that initializes all information pertaining to the received data packet such that the device driver need not reference the local cache of the originating processor.

The illustrative CPU exchange point shown in FIG. 5 may also include a timer 612 that schedules execution of the data packet removal task, whose address is stored in field 606. In this example, the data packet removal task may be executed by the destination processor. Statistics 614 may be a log maintaining miscellaneous information of data packets traveling through the CPU exchange point.

Referring back to FIG. 4 in view of FIG. 5, once an originating processor, such as processor 202, determines that a data packet is intended for another interface, such as Wi-Fi interface 224, the originating processor may submit the data packet to the queue 600, where it will be scheduled for removal at a time set by timer 612. When the predetermined time arrives, processor 204 may execute the data packet removal task referred to in field 606. Processor 204 may begin processing the data packet in accordance with the device driver instructions 234 beginning at the entry point indicated by entry point field 608. As noted above, the foregoing mechanism may also be used in the opposite direction and between other interfaces within access point 106.

Referring back to FIG. 2, if an originating processor determines that the received data packet is not intended for another interface associated with another processor, the processor may continue handling the data packet in accordance with device driver instructions, as shown in block 312.

Advantageously, the above-described system and method utilizes more than one processor for handling data streams while maintaining the correct sequence of the data packets within the stream. Furthermore, the local cache of each processor is made available for other tasks and cache misses are minimized. In this regard, the performance of data routing and forwarding is enhanced. In turn, end users of computers or devices exchanging data over a network experience less latency.

Although the disclosure herein has been described with reference to particular examples, it is to be understood that these examples are merely illustrative of the principles and applications of the disclosure. It is therefore to be understood that numerous modifications may be made to the examples and that other arrangements may be devised without departing from the spirit and scope of the application as defined by the appended claims. Furthermore, while particular processes are shown in a specific order in the appended drawings, such processes are not limited to any particular order unless such order is expressly set forth herein.

The invention claimed is:

1. A system for managing data streams, the system comprising:
a plurality of processors;
a plurality of interfaces, each of the plurality of interfaces therein being associated with a respective processor of the plurality of processors such that data packets received by each of the plurality of interfaces are handled by its respective processor, wherein the respective processor is a processor to:
determine whether a received data packet is intended for a destination interface of the plurality of interfaces, the destination interface being associated with a destination processor of the plurality of processors, the destination processor being different than the respective processor; and
deliver the received data packet to the destination processor, if it is determined that the received data packet is intended for the destination interface.

2. The system of claim 1, wherein delivering the received data packet comprises submitting the received data packet to a queue and scheduling the received data packet for removal from the queue at a predetermined time.

3. The system of claim 2, wherein the destination processor removes the received data packet from the queue at the predetermined time.

4. The system of claim 1, wherein the destination processor handles the received data packet independent of information stored in a cache memory of the respective processor, the information being associated with the received data packet.

5. The system of claim 1, further comprising an interrupt controller to manage interrupt requests generated by each of the plurality of interfaces, wherein associating each of the plurality of interfaces with the respective processor comprises configuring the interrupt controller such that the interrupt controller directs interrupt requests generated by each of the plurality of interfaces to its respective processor.

6. The system of claim 1, wherein some of the plurality of interfaces is an Ethernet interface or a Wi-Fi interface.

7. A method for managing data packets, the method comprising:
associating each of a plurality of interfaces with a respective processor of a plurality of processors such that data packets received by each of the plurality of interfaces are handled by its respective processor;
determining, using the respective processor, whether a received data packet is intended for a destination interface of the plurality of interfaces, the destination interface being associated with a destination processor of the plurality of processors, the destination processor being different than the respective processor; and
delivering, using the respective processor, the received data packet to the destination processor, if it is determined that the received data packet is intended for the destination interface.

8. The method of claim 7, wherein delivering the received data packet comprises submitting the received data packet to a queue and scheduling the received data packet for removal from the queue at a predetermined time.

9. The method of claim 8, wherein the destination processor removes the received data packet from the queue at the predetermined time.

10. The method of claim 9, wherein the destination processor handles the received data packet independent of information stored in a cache memory of the respective processor, the information being associated with the received data packet.

11. The method of claim 7, wherein associating each of the plurality of interfaces with the respective processor comprises configuring an interrupt controller to direct interrupt requests generated by each of the plurality of interfaces to the respective one processor.

12. The method of claim 7, wherein some of the plurality of interfaces is an Ethernet interface or a Wi-Fi interface.

13. A system for managing data streams, the system comprising:
an originating processor associated with an originating interface, the originating processor having an originating cache memory;
a destination processor associated with a destination interface, wherein the originating processor is a processor to:
determine whether a received data packet is intended for the destination interface; and
deliver the received data packet to the destination processor, if it is determined that the received data packet is intended for the destination interface, wherein the destination processor handles the received data packet independent of information stored in the originating cache memory, the information being associated with the received data packet.

14. The system of claim 13, wherein delivering the received data packet comprises submitting the received data packet to a queue and scheduling the received data packet for removal from the queue at a predetermined time.

15. The system of claim 14, wherein the destination processor removes the received data packet from the queue at the predetermined time.

16. The system of claim 13, further comprising an interrupt controller for managing interrupt requests.

17. The system of claim 16, wherein the interrupt controller directs interrupt requests generated by the originating interface to the originating processor.

18. The system of claim 16, wherein the interrupt controller directs interrupt requests generated by the destination interface to the destination processor.

19. The system of claim 13, wherein the originating interface is an Ethernet interface or a Wi-Fi interface.

20. The system of claim 13, wherein the destination interface is an Ethernet interface or a Wi-Fi interface.

21. An access point comprising:
a plurality of processors;
a plurality of interfaces, each of the plurality of interfaces therein being associated with a respective processor of the plurality of processors such that data packets received by each of the plurality of interfaces are handled by its respective processor, wherein the respective processor is a processor to:

determine whether a received data packet is intended for a destination interface of the plurality of interfaces, the destination interface being associated with a destination processor of the plurality of processors, the destination processor being different than the respective processor; and deliver the received data packet to the destination processor, if it is determined that the received data packet is intended for the destination interface, wherein the destination processor handles the received data packet independent of information stored in a cache memory of the respective processor, the information being associated with the received data packet.

* * * * *